United States Patent Office 3,830,792
Patented Aug. 20, 1974

3,830,792
METHOD FOR SYNTHESIZING PEPTIDES USING AN EXCESS OF AN UNSYMMETRICAL ACID ANHYDRIDE
Monohar A. Tilak, Indianapolis, Ind., assignor to Eli Lilly and Company, Indianapolis, Ind.
No Drawing. Continuation-in-part of abandoned application Ser. No. 822,005, May 5, 1969. This application Apr. 27, 1972, Ser. No. 248,303
Int. Cl. C07c *103/52;* C07g *7/00*
U.S. Cl. 260—112.5                                           6 Claims

ABSTRACT OF THE DISCLOSURE

Improvement in mixed anhydride method for peptide synthesis from a peptide or α-amino acid having a free terminal amine group and a protected terminal carboxyl, and a mixed acid anhydride produced from a chloroformate and an amino-blocked α-amino acid, comprising admixing at least 1.5 moles of the anhydride with each mole of the peptide or α-amino acid having the free terminal amine function in a non-aqueous, water-miscible solvent for a time sufficient to allow complete reaction of the protected terminal carboxyl peptide or amino acid, and, without pretreatment of the reaction mixture, hydrolyzing excess acid anhydride by adding to the reaction mixture an aqueous buffer solution having a pH of from about 7.5 to about 9.5.

CROSS-REFERENCE

This application is a continuation-in-part of my copending application Ser. No. 822,005, filed May 5, 1969, now abandoned.

BACKGROUND OF THE INVENTION

Since peptides are important biological substances, and their isolation from biological systems in a pure state is difficult, for the accumulation of large quantities it is necessary to prepare these materials by synthetic chemical methods. These methods involve as a fundamental step the coupling of two or more amino acids to form an amido or peptide linkage between the molecules:

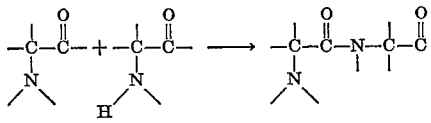

Methods for effecting this coupling employ the usual amide forming reactions, as for example the reaction of an ester with an amide, the reaction of an acid halide with an amine, the reaction of an acid anhydride or carboxyanhydride with an amine, or a like reaction.

This reaction requires at least one available hydrogen in the amide-forming amine, a criterion which is satisfied by all of the naturally occurring α-amino acids and their optical antipodes and by the isomers of such amino acids wherein the amine function is on a carbon atom other than the carbon atom α- to the carboxylic acid function.

SUMMARY OF THE INVENTION

This invention provides a method for improving the process by which peptides, as, for example, glucagon, luteinizing hormone release factor (LHRF), oxytocin, bradykinin, and the like, as well as intermediates of such peptides, are prepared from an amine and an acid anhydride.

Peptides of specifically defined structures, such as those mentioned above as well as many others, exhibit recognized and varied biological activities. Glucagon, for example, is a natural peptide which is highly active in countering hyperglycemia. The process of this invention is applicable to the preparation of glucagon, glucagon intermediates, or any other peptides, examples of which are mentioned above. This process likewise is fully applicable in producing peptides such as those mentioned in U.S. Pat. No. 3,640,991 and correspondingly can be employed in conjunction with the process described in this U.S. Patent. In general, peptides exhibit nutritional value and find great utility in animal feeds as supplements to achieve a desired feed amino acid content. The process of this invention is likewise useful in the production of any of such peptides.

By the process of this invention which is directed to the mixed anhydride method of peptide synthesis, at least a 1.5 molar equivalent of a mixed anhydride which has been produced from a chloroformate and an amino blocked α-amino acid in which any other reactive groups are blocked in reacted with each molar equivalent of an α-amino acid or peptide having a free terminal amine group, a protected C-terminal carboxyl and having any other reactive groups blocked in a non-aqueous, water-miscible solvent at between about ambient room temperature and the freezing point of the reaction mixture for a time sufficient to allow complete reaction of the protected C-terminal carboxyl α-amino acid or peptide; and, without pretreatment of the reaction mixture, the exess mixed anhydride is hydrolyzed by adding to the reation mixture an aqueous buffer solution having a pH of from about pH 7.5 to about pH 9.5.

By this method quantitative yields of the peptide can be obtained without the necessity of employing the usual purification steps of chromatographic or electrophoretic separation of the reaction products.

DETAILED DESCRIPTION

This invention provides an improvement in the process for peptide formation from two appropriately protected amino acids or form a protected amino acid and a protected peptide fragment in which the amine function of one is caused to react with the acid function of the other by way of a mixed anhydride intermediate.

The usual procedure for carrying out this process involves admixing at least an equimolar amount of the anhydride with the amine, allowing reaction to occur, evaporating the solvents, and separating the various products of the reaction by chromatography or electrophoresis.

It would be desirable, in such a process, to increase the conversion of a more valuable reactant to the desired product at the expense of the other reactants, since, if the reaction could be driven to completion with respect to at least one reactant, higher yields and easier purification should result. This would be an especially desirable situation in the preparation of polypeptides, since, as higher molecular weights are attained during synthesis, the differences in the chemical and physical properties between the starting peptide and the product peptide become extremely small and separation becomes complicated and costly as a result of product losses during purification. This advantage has not as yet been realized in heretofore available processes. Although improvements in conversions have been obtained, yields have not been improved due to the occurrence of side reactions and difficulties in purifying the products.

In mehods utilizing mixed anhydrides for peptide bond formation, the disposal of excess anhydride by hydrolytic cleavage methods can cause a concurrent random cleavage of some amide bonds. The occurrence of such undesired cleavage has discouraged the use of excess anhydride and the advantages attributable to increased conversions attainable by the use of excess anhydride. The result of this random cleavage is to contaminate the product with very similar smaller peptides of varying structures. In many cases, microanalysis will not reveal the nonuniformity of the product, and the presence of a multitude of similar but non-identical fragments can be detected only by sophisticated separative techniques.

It has now been found that an excess of a mixed anhydride can be employed and effectively removed without the concomitant formation of substantial amounts of side impurities such as would necessitate extensive further purification of the product. Heretofore, when excess anhydride was employed in the production of a peptide, mild alkaline treatment was applied, but such was done only after the reaction mixture had been substantially reduced in volume by in vacuo evaporation of the solvent and then only as a simple extraction technique and in conjunction with other extraction solvents. The product which was obtained upon this alkaline treatment was found to require further purification [see, for example, Schroder et al., Ann. 864, 243-251 (1965); Schroder, Ann. 691, 232-239 (1965)]. In accordance with this invention, excess mixed anhydride is employed, and such excess is conveniently decomposed by treatment of the reaction mixture with a buffer solution at a pH of from about pH 7.5 to about pH 9.5 upon termination of the period of reaction and without subjection of the reaction mixture to any modification or intervening treatment. Preferably, the buffer solution which is employed is an aqueous solution of an alkali metal bicarbonate, such as potassium bicarbonate, sodium bicarbonate, and the like. More preferably, the buffer solution which is employed is a saturated aqueous solution of an alkali metal bicarbonate having a temperature of about 0° C.

With the availability of a convenient means for effectively and safely decomposing the excess anhydride, it has been found that a 50 mole percent excess of the mixed anhydride can be employed and will cause essentially complete acylation of the coupling peptide.

"Buffer solution" as used in this description refers to an aqueous solution of a salt or salts at about pH 7.5 to about pH 9.5, which solution contains no ions in a sufficient concentration to cause precipitation to occur when it is added to the reaction medium and which solution has the ability to resist rapid changes in pH when acid or alkali is added thereto. Such salts, in addition to alkali metal bicarbonates, can include sodium acetate, potassium acetate, disodium hydrogen phosphate, borax, sodium benzoate, potassium formate, imidazole hydrochloride, and mixed salts depending upon the common ion effect to suppress ionization as for example potassium phthalate, potassium hydrogen phthalate and the like.

Accordingly, by the method of this invention, at least a 50 percent or greater molar excess of a mixed acid anhydride produced from a chloroformate and an amino-blocked α-amino acid in which any other reactive groups are blocked is added to a solution of an α-amino acid or peptide having a free amine group and a protected C-terminal carboxyl and in which any other reactive groups are blocked in a water-miscible, non-aqueous solvent; the reaction is allowed to proceed to completion at a temperature from about ambient room temperature to the freezing point of the reaction mixture; an excess of a buffer solution, as for example an equeous saturated solution of an alkali metal bicarbonate, preferably potassium or sodium bicarbonate, at 0° C., is added to the reaction mixture and is well mixed therewith for about 15 minutes or more to decompose the acid anhydride; and the resulting solid product is removed by filtration, decantation, or dissolution in a water immiscible solvent such as ethyl acetate or a like solvent. When the peptide is extracted into an organic solvent it can be removed therefrom by evaporation of the organic layer.

Mixed anhydrides are used in the method of this invention. These are anhydrides derived from two different acids. In the process of this invention, one of the differing acids will be an acid chloride such as pivaloyl chloride or a derivative of carbonic acid in the form of a chloroformate. Examples of chloroformates used to form mixed anhydrides useful for the present invention are, ethyl choloformate, phenyl chloroformate, 2,2,2-trichloroethyl chloroformate and $C_1$-$C_4$ alkyl chlorofromates such as propyl chloroformate, n-butyl chloroformate, sec.-butyl chloroformate, isobutyl chloroformate, t-butyl chloroformate, and the like.

In order to ensure complete decomposition of the excess anhydride at the completion of the coupling reaction, a sufficient quantity of buffer solution should be added to maintain a final basicity of the reaction solution of about pH 7.5 to about pH 9.5.

In a preferred embodiment of this invention, the sodium or potassium bicarbonate solution is added at about 0° C. to about pH 8, and the resulting solution is stirred vigorously at or below room temperature for up to two hours in order to achieve complete decomposition of the excess mixed anhydride.

As in the usual amidification reactions, it is desirable to use a non-reacting basic material as an acid scavenger, i.e., to remove the acidic products as the reaction progresses. Such non-reactive bases can include highly hindered secondary amines as for example di-tert.-butylamine, dicyclohexylamine, diisopropylamine, or the like; or tertiary amine bases as for example triethylamine, dimethylethylamine, ethyldimethylamine, ethyldiisopropylamine, N-methylpyrrolidine, dimethylaniline, tribenzylamine, and like tertiary amines.

Inert solvents useful for the reaction can include such water-miscible solvent as N,N-dimethylformamide, N-methylpyrrolidone hexamethylphosphoramide, N,N-dimethylacetamide, and the like.

The anhydride technique of this invention is applicable to any amino acid which can be joined or coupled to an existing fragment of a C-protected peptide chain. Preferably, the peptide which is prepared by the process of this invention will have the formula

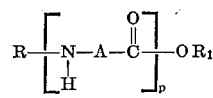

and will be produced by reacting a compound of the formula

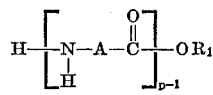

with a compound of the formula

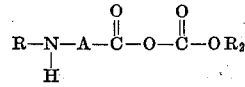

In the above formulae each A is the same or different and is the residue of a naturally-occurring α-amino acid and has any reactive groups suitably protected; R is benzyloxycarbonyl, tert - butyloxycarbonyl, allyloxycarbonyl, trifluoroacetyl, phthaloyl, or o-nitrophenylsulfenyl; $R_1$ is a carboxy protecting group, $R_2$ is lower alkyl, phenyl, or 2,2,2-trichloroethyl; and p is an integer from 2 to 10.

More preferably, the peptide which is prepared by the process of this invention will have the formula

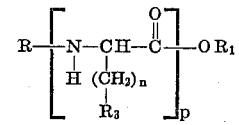

and will be produced by reacting a compound of the formula

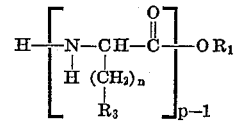

with a compound of the formula

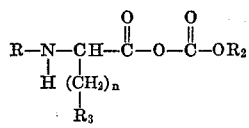

In the above formulae, R, $R_2$, and $p$ are as hereinabove defined, and $n$ is 0 or 1.

Each $R_3$ independently is hydrogen, lower alkyl, protected hydroxy-substituted lower alkyl, protected carboxy-substituted lower alkyl, lower-alkyl-mercapto-substituted lower alkyl, protected mercapto-substituted lower alkyl, protected guanidino-substituted lower alkyl, protected guanidinooxy-substituted lower alkyl, protected amino-substituted lower alkyl, protected imidazolylmethyl, indolylmethyl, or protected 4-hydroxyphenyl; and each $n$ independently is zero or one.

Preferably, $R_1$ is lower alkyl, $C_5$–$C_7$ cycloalkyl, benzyl, $C_1$–$C_4$ alkoxybenzyl, p-nitrobenzyl, 2,2,2-trichloroethyl, and the like.

"Lower alkyl" as used in this description includes methyl, ethyl, n-propyl, isopropyl, n-butyl, isobutyl, sec.-butyl, and tert.-butyl.

"Hydroxy-substituted lower alkyl" can include hydroxymethyl, α-hydroxyethyl, β-hydroxyethyl, α-hydroxypropyl, β-hydroxypropyl, γ-hydroxypropyl, 2-hydroxy-2-propyl, 2-hydroxy-2-butyl, 3-hydroxy-2-butyl, hydroxy-tert.-butyl, and the like.

"Protected hydroxy-substituted lower alkyl" includes the aforementioned hydroxy-substituted groups wherein the hydroxy function is protected by an appropriate protecting group well known in the art. Appropriate protecting groups include $C_1$–$C_4$ alkyl, for example, methyl, ethyl, and tert-butyl; benzyl; substituted benzyl, such as p-alkoxybenzyl; and $C_1$–$C_3$ alkanoyl, such as formyl, acetyl, and propionyl.

"Carboxy-substituted lower alkyl" can include carboxymethyl, carboxyethyl, 2-carboxy-2-propyl, 2-carboxymethyl-2-propyl, and the like.

"Protected carboxy-substituted lower alkyl" includes the aforementioned carboxy-substituted groups wherein the carboxy group is protected by an appropriate protecting group well known in the art. Appropriate protecting groups include $C_1$–$C_4$ alkyl, for example, methyl,, ethyl, and tert-butyl; $C_5$–$C_7$ cycloalkyl, for example, cyclopentyl and cyclohexyl; benzyl; $C_1$–$C_4$ alkoxybenzyl, for example, p-methoxybenzyl, 2,6-dimethoxybenzyl, p-ethoxybenzyl, and p-t-butoxybenzyl; p-nitrobenzyl; and 2,2,2-trichloroethyl.

"Lower - alkyl - mercapto - substituted lower alkyl" can include methylmercaptoethyl, isopropylmercaptomethyl, n-propylmercaptoethyl, methylmercaptobutyl, 2-methylmercapto - 2 - propyl, 3-methylmercapto-2-butyl, 2-methylmercaptomethyl-2-propyl, and the like.

"Mercapto-substituted lower alkyl" includes groups such as mercaptomethyl, 1-mercaptoethyl, 2-mercaptoethyl, 3-mercaptopropyl, 3-mercaptobutyl, and the like.

"Protected mercapto-substituted lower alkyl" refers to groups such as the aforementioned mercapto-substituted lower alkyl protected from reaction by an appropriate protecting group well known in the art. Appropriate protecting groups include benzyl, tetrahydropyranyl, $C_1$–$C_3$ alkylcarbamoyl such as ethylcarbamoyl, p-methoxybenzyl, β,β-diethoxycarbonylethyl, benzyloxycarbonyl, and the like.

"Guanidino-substituted lower alkyl" can include guanidinomethyl, guanidinoethyl, 2-guanidino-2-propyl, α,α-dimethylguanidinoethyl, and the like.

"Protected guanidino-substituted lower alkyl" refers to groups such as the aforementioned guanidino-substituted lower alkyl having the guanidino function protected by an appropriate protecting group well known in the art. Appropriate protecting groups include carbobenzoxy, t-butoxycarbonyl, t-amyloxycarbonyl, adamantyloxycarbonyl, and the like.

"Guanidinooxy-substituted lower alkyl" refers to the above guanidino-substituted lower alkyl substituent wherein the heterocyclic guanidine group is attached to the lower alkyl group through an additional oxygen atom.

"Protected guanidinooxy-substituted lower alkyl" refers to groups such as the forementioned guanidinooxy-substituted lower alkyl having the guanidinooxy function protected by an appropriate protecting group well known in the art. Appropriate protecting groups include carbobenzoxy, t-butoxycarbonyl, t-amyloxycarbonyl, adamantyloxycarbonyl, and the like.

"Amino-substituted lower alkyl" can include aminoethyl, aminomethyl, 2-mino-2-propyl, 3-aminopropyl, 1-aminopropyl, and the like.

"Protected amino-substituted lower alkyl" includes groups such as the aforementioned amino-substituted lower alkyl groups protected by an appropriate protecting group well known in the art. Appropriate protecting groups include carbobenzoxy, p-methoxycarbobenzoxy, t-butoxycarbonyl, t-amyloxycarbonyl, adamantyloxycarbonyl, cyclopentyloxycarbonyl, and the like.

"Protected imidazolylmethyl" refers to protection of the imidazolyl group by substitution of the amino hydrogen with an appropriate protecting group well known in the art. Appropriate protecting groups include, for example, benzyl, t-butoxycarbonyl, adamantyloxycarbonyl, and the like.

"Protected 4-hydroxyphenyl" refers to a 4-hydroxyphenyl group having the hydroxy substituent protected by an appropriate protecting group well known in the art. Appropriate protecting groups include $C_1$–$C_4$ alkyl, for example, methyl, ethyl and t-butyl, benzyl, substituted benzyl, such as p-alkoxybenzyl, and $C_1$–$C_3$ alkanoyl, such as acetyl and propionyl.

Examples of α-aminocids which will undergo reaction to form peptides by the method of this invention include the following, classified in accordance with the nature of the substituent designated as $R_3$ in the foregoing formula.

| $R_3$ | Common name |
| --- | --- |
| H | Glycine, sarcosine. |
| Alkyl | Alanine. Valine. α-Amino-n-butyric acid. Iso-leucine. Tert.-leucine. |
| Hydroxy-substituted lower alkyl | Serine. Threonine. Hydroxyvaline. |
| Carboxy-substituted lower alkyl | Aspartic acid. Glutamic acid. |
| Lower-alkyl-mercapto-substituted lower alkyl. | Methionine. Ethionine. S-ethylcysteine. S-methylhomocysteine. |
| Guanidino-substituted lower alkyl | Arginine. |
| Guanidinooxy-substituted lower alkyl | Canavanine. |
| Amino-substituted lower alkyl | Ornithine. Lysine. |
| Imidazolylmethyl | Histidine. 1-methylhistidine. |
| Indolylmethyl | Tryptophan. |
| Phenyl | Phenylglycine. Phenylalanine. |
| Piperidine | Pipecolic acid. |
| Pyrrolidine | Proline. |

As mentioned hereinabove, the non-participating functional groups of the reacting amino acids or the reacting peptide chain must be rendered inactive. Several methods are well known to chemists for such inactivation. In particular, two points must be inactivated. The terminal carboxyl group of the amino acid or peptide which is reacted with the mixed anhydride must be suitably inactivated. Correspondingly, the amino function of the reacting amino acid mixed anhydride must be suitably inactivated. Thus, two types of protecting groups are necessary for this invention: a C-terminal protecting group, which includes those groups which render the acid portion of the amino acid inactive, as for example alcohol derivatives, to prepare esters, and the like; and a N-terminal protecting group, which includes those groups which render the amine portion unreactive, such as benzyloxycarbonyl, substituted benzyloxycarbonyl, tert. - butyloxycarbonyl, allyloxycarbonyl, trifluoroacetyl, phthaloyl, o-nitrophenylsulfenyl, and the like. The mild nature of the aqueous sodium or potassium bicarbonate solution used to decompose excess anhydride does not limit in any way the use of the commonly accepted protecting groups.

The following examples illustrate the use of the method of this invention to prepare analytically and chromatographically pure polypeptides without purification of the intermediate or final peptides.

EXAMPLE I $N^2$-Benzyloxycarbonyl - $N^5$ - xanthylglutamine methyl ester, 2.37 g., 5 millimoles (mM.), was dissolved in a mixture of dimethylformamide and methanol containing 3 ml. of acetic acid. The solution was saturated with hydrogen gas at atmospheric pressure in the presence of 0.5 g. of a 5% palladium on carbon catalyst until evolution of carbon dioxide had ceased. The catalyst was removed by filtration and the filtrate distilled in vacuo to give a residue of $N^5$-xanthylglutamine methyl ester.

N-Benzyloxycarbonyl-L-alanine, 2.33 g. (10 mM.), was dissolved in dimethylformamide and cooled to $-15°$ C. To the solution was added 1.39 ml. (10 mM.) of triethylamine and 1.30 ml. (10 mM.) of isobutylchloroformate. The resulting mixture was stirred for 10 minutes at $-15°$ C. and then added to a solution of the above $N^5$-xanthylglutamine methyl ester also dissolved in dimethylformamide and cooled to $-15°$ C. The reaction mixture was kept at $-15°$ C. for 16 hours and then warmed to $0°$ C., and saturated ($0°$ C.) aqueous sodium bicarbonate solution was added to pH 8. The desired dipeptide crystallized immediately and was removed by filtration and washed with water. Thin-layer chromatographic characterization on silica gel showed one-spot material differing from the starting compounds when developed vertically in a tetrahydrofuran-cyclohexane-water system. Yield 89%; Melting point: 204 (dec.); 207–208 (melt).

Analysis: Calcd. C, 66.04; H, 5.73; N, 7.70; O, 20.53. Found: C, 66.27; H, 5.80; N, 7.80; O, 20.40.

The dipeptide was hydrogenolyzed by the procedure above to remove the N-benzyloxycarbonyl group and was then dissolved in dimethylformamide. This solution was cooled to $-15°$ C. and N-benzoyloxycarbonylnitroarginine isobutyl carbonate, prepared from 3.53 g. (10 mM.) of N - benzyloxycarbonylnitroarginine, 1.40 ml. (10 mM.) of triethylamine and 1.30 ml. (10 mM.) of isobutylchloroformate, was added. The reaction mixture was held at $-15°$ C. overnight, warmed to $0°$ C., and treated with 12 ml. of a saturated ($0°$ C.) aqueous solution of sodium bicarbonate to pH 8. The resulting mixture was added slowly to 800 ml. of cold water and stirred for 2 hours to crystallize the tripeptide product, N-benzyloxycarbonyl - nitroarginylalanyl - $N^5$ - xanthylglutamine methyl ester which was removed by filtration, washed with water, and dried under vacuum over $P_2O_5$. Yield 100%.

Analysis: Calcd. C, 57.90; H, 5.67; N, 15.01; O, 21.43. Found: C, 57.73; H, 5.64; N, 14.92; O, 21.43.

Thin layer chromatography developed as above showed one-spot material differing from the starting dipeptide.

EXAMPLE II

This example demonstrates the advantage of the process of this invention over prior art methods by comparing this method with a method by which the coupling reaction mixture is altered prior to treatment with an aqueous buffer solution.

A. Prior Art Mixed Anhydride Method

The hydrochloride amine salt of phenylalanine, methyl ester, 1.08 g. (5 mM.), was dissolved in 30 ml. of dimethylformamide. The solution was cooled to about $-15°$ C., and 0.55 ml. (5 mM.) or N-methylmorpholine was added to generate the free amine.

In a separate flask 2.60 g. (8 mM.) of N-benzyloxycarbonylphenylalanine was dissolved in 30 ml. of dimethylformamide. The resulting mixture was cooled to about $-15°$ C., and 0.88 ml. (0.8 mM.) of N-methylmorpholine and 0.97 ml. (7.6 mM.) of isobutyl chloroformate were added. The mixture was stirred for about ten minutes to assure formation of the mixed anhydride, and the resulting mixture was added to the phenylalanine, methyl ester solution. The combined mixture was stirred at about $-15°$ C. for about three hours. The mixture was then evaporated in vacuo using a rotary evaporator. A substantial amount of the dimethylformamide solvent was thereby removed from the mixture. The residue was then triturated with 200 ml. of saturated aqueous potassium bicarbonate. Trituration was continued until the mixture became filterable. The mixture was then filtered, and the solid which was collected was washed with additional amounts of aqueous potassium bicarbonate until the filtrate had a pH of about 8. The solid was then washed eight times with water and dried in vacuo. The product, N - benzyloxycarbonylphenylalanyl-phenylalanine, methyl ester, had a melting point of 134–36° C., weighed 2.93 g., which represents a yield of about 127 percent, and was shown by thin layer chromatography (TLC) to be substantially impure.

B. Mixed Anhydride Method of This Invention

The above reaction was repeated using the same reactants, quantities of reactants, and conditions as delineated hereinabove. The reaction mixture was maintained at $-15°$ C. overnight. To the mixture was then added saturated aqueous potassium bicarbonate at $0°$ C. in an amount sufficient to bring the pH of the reaction mixture to about 8. A total of about 50 ml. of the potassium bicarbonate solution was added. The mixture was then stirred for about 0.5 hours, and the pH was again measured and found to be about 8. Some of the product precipitated from the mixture during this time, and further product amounts were precipitated by addition to the mixture of about 200 ml. of a 30 percent aqueous sodium chloride solution. The resulting mixture was then cooled, filtered, and the recovered solid product was washed with water. The product was then dried in vacuo to produce 2.36 g. (102 percent yield) of the above dipeptide having a melting point of 138–40° C. in a highly pure state as shown by TLC analysis.

Analysis: Calculated for $C_{27}H_{28}N_2O_5$. C, 70.42; H, 6.13; N, 6.08; O, 17.37. Found C, 70.37; H, 6.06; N, 6.83; O, 16.85.

EXAMPLE III

This example again compares the typical mixed anhydride method of peptide synthesis of the prior art with the mixed anhydride method of this invention.

A. Prior Art Mixed Anhydride Method

To about 30 ml. of dimethylformamide was added 1.08 g. (5 mM.) of the hydrochloride amine salt of phenylalanine, methyl ester. The mixture was cooled to about $-15°$ C. To the mixture was then added 0.55 ml. (5 mM.) of N-methylmorpholine to convert the amine salt to the free amine.

In a separate flask was dissolved 1.79 g. (8 mM.) of N-benzyloxycarbonylalanine in 30 ml. of dimethylformamide. The solution was cooled to about $-15°$ C., and 0.88 ml. (8 mM.) of N-methylmorpholine and 0.97 ml. (7.6 mM.) of isobutylchloroformate were added. The resulting mixture was stirred for about ten minutes to accomplish formation of the mixed anhydride, and the resulting mixture was then added to the phenylalanine, methyl ester solution. The reaction mixture was then stirred at about −15° C. for about three hours, after which time the reaction mixture was subjected to *in vacuo* evaporation using a rotary evaporator to remove as much dimethylformamide as possible. The residual reaction mixture was then triturated with 200 ml. of saturated aqueous sodium bicarbonate. Trituration was continued until the mixture became filterable. The mixture was then filtered, and the filter cake was washed with aqueous sodium bicarbonate until the filtrate which was obtained had a pH of about 8. The filter cake was then washed six times with water and dried *in vacuo* to produce 2.35 g. of N - benzyloxycarbonylalanylphenylalanine, methyl ester. The product had a melting point of 89–93° C. and the amount of product recovered represents a yield of about 122 percent. TLC of the resulting product demonstrated it to be substantially impure. Amino acid analysis indicated the following proportionate residues of amino acids: alanine: 1.39; phenylalanine: 1.00.

B. Mixed Anhydride Method of This Invention

The above reaction was repeated using the same reactants, quantities of reactants, and conditions as delineated hereinabove. The resulting reaction mixture was stored overnight at a temperature of about −15° C. To the reaction mixture was then added saturated aqueous sodium bicarbonate solution at a temperature of about 0° C., in an amount sufficient to raise the pH of the mixture to about pH 8. A total of about 75 ml. of the saturated aqueous sodium bicarbonate solution was added. The mixture was stirred for about 0.5 hour, and the pH thereof was again determined and found to be about 8. The product was further precipitated from the mixture by addition of about 300 ml. of 30 percent aqueous sodium chloride solution at about 0° C. The mixture was then filtered, and the filter cake was washed six times with water. The solid product was then dried *in vacuo* to yield 1.89 g. (98.6 percent) of the above dipeptide having a melting point of 98–99° C. TLC analysis showed the product to be substantially pure, and amino acid analysis indicated the following proportionate residues of amino acids: alanine: 1.09; phenylalanine: 1.0.

Analysis: Calculated for $C_{21}H_{24}N_2O_5$. C, 65.61; H, 6.29; N, 7.29; O, 20.81. Found C, 65.36; H, 6.26; N, 7.20; O, 21.02.

Employing the procedure described hereinabove, the following peptides were also prepared.

EXAMPLE IV

B-*t*-Butyl-α-ethyl aspartate was reacted with the mixed anhydride formed from isobutyl chloroformate and N-benzyloxycarbonyl-leucine to produce N-benzyloxycarbonyl-leucyl-β-*t*-butyl-α-ethyl aspartate.

EXAMPLE V

The N-terminal protecting group of the product of Example IV was hydrogenolytically cleaved, and the resulting dipeptide was reacted with the mixed anhydride from isobutyl chloroformate and N-benzyloxycarbonyl-O-*t*-butyl-tyrosine to produce N-benzyloxycarbonyl-O-*t*-butyl-tyrosyl-leucyl-β-*t*-butyl-α-ethyl aspartate.

EXAMPLE VI

The N-terminal protecting group of the product of Example V was hydrogenolytically cleaved, and the resulting tripeptide was reacted with the mixed anhydride from isobutyl chloroformate and $N^\alpha$-*t*-benzyloxycarbonyl-$N^\epsilon$-*t*-butyloxycarbonyllysine to produce Nα-benzyloxycarbonyl-$N^\epsilon$-*t*-butyloxycarbonyl-lysyl-O-*t* - butyl - tyrosyl-leucyl-β-*t*-butyl-α-ethyl aspartate.

EXAMPLE VII

The N-terminal protecting group of the product of Example VI was hydrogenolytically cleaved, and the resulting tetrapeptide was reacted with the mixed anhydride from isobutyl chloroformate and N-benzyloxycarbonyl-O-*t*-butylserine to produce N-benzyloxycarbonyl - O - *t*-butylseryl-$N^\epsilon$-*t*-butyloxycarbonyl-lysyl-O-*t* - butyltyrosyl-leucyl-β-*t*-butyl-α-ethyl aspartate.

EXAMPLE VIII

The N-terminal protecting group of the product of Example VII was hydrogenolytically cleaved, and the resulting pentapeptide was reacted with the mixed anhydride from isobutylchloroformate and N - benzyloxycarbonyl-O - *t* - butyltyrosine to produce N - benzyloxycarbonyl-O-*t*-butyltyrosyl-O-*t*-butylseryl-$N^\epsilon$ - *t* - butyloxycarbonyl-lysyl - O - *t* - butyltyrosyl - leucyl - β - *t* - butyl-α-ethyl asparatate.

EXAMPLE IX

The N-terminal protecting group of the product of Example VIII was hydrogenolytically cleaved, and the resulting hexapeptide was reacted with the mixed anhydried from isobutyl chloroformate and N-benzyloxycarbonyl-β - *t* - butylaspartic acid to produce N - benzyloxycarbonyl-β-*t*-butylaspartyl-O-*t*-butyltyrosyl-O - *t* - butylseryl-$N^\epsilon$-*t* - butyloxycarbonyl - lysyl - O - *t* - butyltyrosyl-leucyl-β-*t*-butyl-α-ethyl aspartate.

EXAMPLE X

The N-terminal protecting group of the product of Example IX was hydrogenolytically cleaved, and the resulting heptapeptide was reacted with the mixed anhydride from isobutyl chloroformate and N-benzyloxycarbonyl-O-*t*-butylserine to produce N - benzyloxycarbonyl - O - *t*-butylseryl-β-*t*-butylaspartyl-O-*t*-butyltyrosyl-O - *t* - butylseryl-$N^\epsilon$-*t*-butyloxycarbonyl-lysyl-O-*t*-butyltyrosyl - leucyl-β-*t*-butyl-α-ethyl aspartate.

EXAMPLE XI

The N-terminal protecting group of the product of Example X was hydrogenolytically cleaved, and the resulting octapeptide was reacted with the mixed anhydride from isobutyl chloroformate and N-benzyloxycarbonyl-O-*t*-butylthreonine to produce N-benzyloxycarbonyl-O-*t*-butylthreonyl-O-*t*-butylseryl-β - *t* - butylaspartyl - O - *t*-butyltyrosyl-O-*t* - butylseryl - $N^\epsilon$ - *t* - butyloxycarbonyl-lysyl-O-*t*-butyltyrosyl-leucyl-β-*t*-butyl-α-ethyl aspartate.

The following peptide sequences were also prepared by the above described procedure.

N-Benzyloxycarbonylgutaminyl - α,β - di*tert*. - butyl aspartate.

N-Benzyloxycarbonylglutaminyl-β-*tert*.-butyl α - ethyl aspartate.

N - Benzyloxycarbonylalanyl - glutaminyl-α,β - di*tert*.-butyl aspartate.

N-Benzyloxycarbonylalanyl-glutaminyl - β - *tert*. - butyl α-ethyl aspartate.

N-Benzyloxycarbonylnitroarginyl - alanyl - glutaminyl-α,β-di*tert*.-butyl aspartate.

N-Benzyloxycarbonylnitroarginyl - alanyl - glutaminyl-β-*tert*.-butyl α-ethylaspartate.

Tribenzyloxycarbonylarginyl-alanyl - glutaminyl - α,β-di*tert*.-butyl aspartate.

Tribenzyloxycarbonylarginyl - acetylarginyl - alanyl-glutaminyl-α,β-di*tert*.-butyl aspartate.

N-Benzyloxycarbonyl-O-*tert*.-butylseryl - acetylarginyl-acetylarginyl-alanyl-glutaminyl-α,β-ditert.-butyl aspartate.

N-Benzyloxycarbonylglutaminyl-glycine ethyl ester.

N-Benzyloxycarbonyl-O-*tert*. - butylseryl - glutaminyl-glycine ethyl ester.

N-Benzyloxycarbonyltryptophyl-leucine methyl ester.

N-Benzyloxycarbonylglutaminyl - tryptophyl - leucine methyl ester.

N - Benzyloxycarbonylvalyl - glutaminyl - tryptophyl-leucine methyl ester.

N-Benzyloxycarbonylphenylalanyl - valyl - glutaminyl-tryptophyl-leucine methyl ester.

N-*tert.* - Butyloxycarbonylphenylalanyl - valyl - glutaminyl-tryptophyl-leucine methyl ester.

N-Benzyloxycarbonyl - O - tert. - butylseryl - β - *tert.*-butyl α-ethyl aspartate.

N-Benzyloxycarbonyl-O-tert. - butylthreonyl - O - *tert.*-butyl - seryl-β-*tert.*-butyl α-ethyl aspartate.

N-Benzyloxycarbonylphenylalanyl - O - *tert.* - butylthreonyl-O-*tert.*-butylseryl-β-*tert.*-butyl α-ethyl aspartate.

N-Benzyloxycarbonyl-O - *tert.* - butylthreonyl - phenylalanyl-O-*tert.* - butylthreonyl - O - *tert.* - butylseryl - β-*tert.*-butyl α-ethyl aspartate.

What is claimed is:

1. In a process for the synthesis of peptides of α-amino acids by the mixed anhydride method wherein a mixed anhydride produced from a chloroformate and an amino-blocked α-amino acid in which any other reactive groups are blocked is reacted with an α-amino acid or peptide having a free terminal amine group and a protected terminal carboxyl and in which any other reactive groups are blocked to form a peptide, the improvement which comprises (a) admixing at least a 1.5 molar equivalent of the mixed anhydride with each molar equivalent of the α-amino acid or peptide in a non-aqueous, water-miscible solvent at between about ambient room temperature and the freezing point of the resulting reaction mixture for a time sufficient to allow complete reaction of the protected terminal carboxyl α-amino acid or peptide with the anhydride; and (b) without pretreatment of the reaction mixture, hydrolyzing the excess mixed anhydride by adding to the reaction mixture an aqueous buffer solution having a pH of from about pH 7.5 to about pH 9.5.

2. Process of claim 1, in which the peptide which is prepared has the formula $$\left[ R-\underset{H}{\overset{}{N}}-A-\overset{O}{\overset{\|}{C}}-OR_1 \right]_p$$

and is produced by reacting a compound of the formula $$H-\left[ \underset{H}{\overset{}{N}}-A-\overset{O}{\overset{\|}{C}}-OR_1 \right]_{p-1}$$

with a compound of the formula $$R-\underset{H}{\overset{}{N}}-A-\overset{O}{\overset{\|}{C}}-O-\overset{O}{\overset{\|}{C}}-OR_2$$

in which each A is the same or different and is the residue of a naturally-occurring α-amino acid and has any reactive groups protected;

R is benzyloxycarbonyl, *tert*-butyloxycarbonyl allyloxycarbonyl, trifluoroacetyl, phthaloyl, or *o*-nitrophenylsulfenyl;

$R_1$ is a carboxy protecting group;

$R_2$ is lower alkyl, phenyl, or 2,2,2-trichloroethyl; and $p$ is an integer from 2 to 10.

3. Process of claim 1, in which the peptide which is prepared has the formula $$\left[ R-\underset{\underset{R_3}{|}}{\underset{H}{\overset{}{N}}}-\underset{(CH_2)_n}{\overset{}{C}}H-\overset{O}{\overset{\|}{C}}-OR_1 \right]_p$$

and is produced by reacting a compound of the formula $$\left[ -\underset{\underset{R_3}{|}}{\underset{H}{\overset{}{N}}}-\underset{(CH_2)_n}{\overset{}{C}}H-\overset{O}{\overset{\|}{C}}-OR_1 \right]_{p-1}$$

with a compound of the formula $$R-\underset{H}{\overset{}{N}}-\underset{\underset{R_3}{|}}{\underset{(CH_2)_n}{\overset{}{C}}}H-\overset{O}{\overset{\|}{C}}-O-\overset{O}{\overset{\|}{C}}-OR_2$$

in which R is benzyloxycarbonyl, *tert*-butyloxycarbonyl, alyloxycarbonyl, trifluoroacetyl, phethaloyl, or *o*-nitrophenylsulfenyl;

$R_1$ is lower alkyl, $C_5$-$C_7$ cycloalkyl, benzyl, $C_1$-$C_4$ alkoxybenzyl, *p*-nitrobenzyl, or 2,2,2-trichloroethyl;

each $R_3$ independently is hydrogen, lower alkyl, protected hydroxy-substituted lower alkyl, protected carboxy-substituted lower alkyl, lower alkyl-mercapto-substituted lower alkyl, protected mercapto-substituted lower alkyl, protected guanidino-substituted lower alkyl, protected guanidinooxy-substituted lower alkyl, protected amino-substituted lower alkyl, protected imidazolylmethyl, indolylmethyl, or protected 4-hydroxyphenyl;

each $n$ independently is 0 or 1; and $p$ is an integer from 2 to 10.

4. Process of claim 1, in which the buffer solution is an aqueous alkali metal bicarbonate solution.

5. Process of claim 4, in which the buffer solution is an aqueous sodium bicarbonate solution.

6. Process of claim 4, in which the buffer solution is an aqueous potassium bicarbonate solution.

References Cited

UNITED STATES PATENTS

| | | | |
|---|---|---|---|
| 3,640,991 | 2/1972 | Callahan | 260—112.5 |
| 3,264,281 | 8/1966 | Applewhite et al. | 260—112.5 |
| 2,713,574 | 7/1955 | Vaughan | 260—112 |

OTHER REFERENCES

Schroder, Ann. *691*, 232 (1966).
Schroder et al.; Ann. *684*, 243 (1965).
Tilak et al.: Tet. Lett., *1968*, 1297.
Guttmann, Helv. Chim. Acta, *44*, 734 (1961).
Weygand et al.: Z. Naturforsch, *22B*, 1084 (1967).
Anderson et al. J. Am. Chem. Soc., *89*, 5012 (1967).

LEWIS GOTTS, Primary Examiner

R. J. SUYAT, Assistant Examiner

O-1050
5/69)

UNITED STATES PATENT OFFICE
CERTIFICATE OF CORRECTION

Patent No. 3,830,792          Dated August 20, 1974

Inventor(s) Monohar A. Tilak

It is certified that error appears in the above-identified patent and that said Letters Patent are hereby corrected as shown below:

Column 1, line 51, "amide" should read --amine--.

Column 2, line 16, "in" should read --is--.

Column 4, line 29, "solvent" should read --solvents--.

Column 6, line 6, "forementioned" should read --aforementioned--.

Column 6, line 34, "α-aminocids" should read --α-aminoacids--.

Column 7, lines 1-2, "invention" should read --inactivation--.

Column 7, line 53, "N-benzoyloxycarbonylnitroar-" should read -- N-benzyloxycarbonylnitroar- --.

Column 9, line 55, "B-$\underline{t}$-Butyl-α-ethyl" should read -- β-$\underline{t}$-Butyl-α-ethyl --.

Column 9, line 73, "Nα-benzyloxy-" should read --$N^{\alpha}$-benzyloxy- --.

Column 10, line 63, "α-ethylaspartate" should read -- α-ethyl aspartate --.

Column 12, the second formula should read

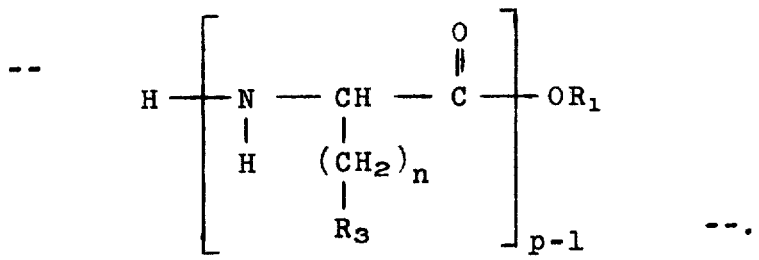

--.

Signed and sealed this 31st day of December 1974.

(SEAL)
Attest:

McCOY M. GIBSON JR.        C. MARSHALL DANN
Attesting Officer            Commissioner of Patents